US012110842B2

(12) United States Patent
Lebeault et al.

(10) Patent No.: US 12,110,842 B2
(45) Date of Patent: Oct. 8, 2024

(54) AIR OUTLET FOR A NACELLE FOR AN AIRCRAFT BYPASS TURBOJET ENGINE COMPRISING A GUIDING DEVICE TO FAVOR A REVERSE THRUST PHASE

(71) Applicant: SAFRAN AIRCRAFT ENGINES, Paris (FR)

(72) Inventors: Eva Julie Lebeault, Moissy-Cramayel (FR); Daniel-Ciprian Mincu, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/905,055

(22) PCT Filed: Mar. 2, 2021

(86) PCT No.: PCT/EP2021/055103
§ 371 (c)(1),
(2) Date: Aug. 25, 2022

(87) PCT Pub. No.: WO2021/180509
PCT Pub. Date: Sep. 16, 2021

(65) Prior Publication Data
US 2023/0090029 A1 Mar. 23, 2023

(30) Foreign Application Priority Data
Mar. 9, 2020 (FR) ........................................ 2002285

(51) Int. Cl.
*F02K 1/66* (2006.01)
*F02K 1/72* (2006.01)
*F02K 3/04* (2006.01)

(52) U.S. Cl.
CPC .................. *F02K 1/66* (2013.01); *F02K 1/72* (2013.01); *F02K 3/04* (2013.01); *F05D 2260/70* (2013.01)

(58) Field of Classification Search
CPC ..... F02K 1/70; F02K 1/72; F02K 1/66; F02K 1/625; F02K 1/09; F02K 1/64; F02K 1/008; F02K 3/04
See application file for complete search history.

(56) References Cited

U.S. PATENT DOCUMENTS 3,095,697 A * 7/1963 Reinhart ................... F02K 1/56
181/219
3,815,357 A * 6/1974 Brennan ................... F02K 1/70
244/76 B (Continued)

FOREIGN PATENT DOCUMENTS

EP 2075194 A1 * 7/2009 ............. F01D 25/02
EP 3023624 A1 5/2016

(Continued)

OTHER PUBLICATIONS

Search Report from the French Intellectual Property Office on corresponding FR application (FR2002285) dated Oct. 28, 2020.

(Continued)

*Primary Examiner* — Craig Kim
(74) *Attorney, Agent, or Firm* — Alumen IP Law PC

(57) ABSTRACT

An air outlet for a nacelle for an aircraft turbofan having an inner wall and an outer wall connected to each other by a trailing edge, at least one radial through aperture extending over an angular portion of the air outlet and having inner and outer open faces and, for each aperture, a guiding device having inner and outer movable members movably mounted between a closed position wherein the inner and outer movable members respectively close off the inner and outer open faces, the aperture defining a closed cavity and an open (Continued)

position wherein the inner and outer movable members are configured to allow an external air flow to circulate in the aperture to support a reverse thrust phase.

15 Claims, 8 Drawing Sheets

(56) References Cited

U.S. PATENT DOCUMENTS

| | | | |
|---|---|---|---|
| 3,824,785 A | 7/1974 | Soligny et al. | |
| 3,988,889 A * | 11/1976 | Chamay | F02K 1/66 60/771 |
| 4,922,712 A * | 5/1990 | Matta | F02K 1/70 239/265.29 |
| 5,706,649 A * | 1/1998 | Robinson | F02K 1/008 60/229 |
| 5,713,537 A * | 2/1998 | Tindell | F02K 1/64 239/265.17 |
| 8,720,818 B1 * | 5/2014 | Teulou | B64D 33/04 244/110 B |
| 9,181,898 B2 * | 11/2015 | Bhatt | F02K 1/72 |
| 9,435,293 B2 * | 9/2016 | Suciu | F01D 25/24 |
| 10,113,508 B2 * | 10/2018 | Stuart | F02K 1/72 |
| 10,563,615 B2 * | 2/2020 | Howarth | F02K 1/70 |
| 10,995,700 B2 * | 5/2021 | Ridray | B64D 29/06 |
| 11,649,785 B1 * | 5/2023 | Schrell | F02K 1/70 60/226.2 |
| 2009/0288386 A1 * | 11/2009 | Marshall | F02K 1/09 60/204 |
| 2010/0044503 A1 * | 2/2010 | Bulin | F02K 3/06 60/226.3 |
| 2010/0072324 A1 * | 3/2010 | Teulou | F02K 1/763 60/226.2 |
| 2011/0146229 A1 * | 6/2011 | Bajusz | F02C 7/14 415/178 |
| 2016/0222917 A1 * | 8/2016 | Segat | B64D 33/06 |
| 2017/0321632 A1 * | 11/2017 | Howarth | F02K 1/70 |
| 2019/0085771 A1 | 3/2019 | Schwarz et al. | |
| 2023/0090029 A1 * | 3/2023 | Lebeault | F02K 3/04 |
| 2023/0095723 A1 * | 3/2023 | Sibbach | F02K 1/66 60/772 |
| 2023/0127457 A1 * | 4/2023 | West | F02K 1/72 60/226.2 |

FOREIGN PATENT DOCUMENTS

| | | |
|---|---|---|
| FR | 2162257 A1 | 7/1973 |
| GB | 1360238 A | 7/1974 |

OTHER PUBLICATIONS

International Search Report and Written Opinion on corresponding PCT application (PCT/EP2021/055103) from International Searching Authority (EPO) dated May 6, 2021.

* cited by examiner

AIR OUTLET FOR A NACELLE FOR AN AIRCRAFT BYPASS TURBOJET ENGINE COMPRISING A GUIDING DEVICE TO FAVOR A REVERSE THRUST PHASE

TECHNICAL FIELD

The present invention relates to the field of aircraft bypass turbojet engines and more particularly targets an air outlet for a nacelle for an aircraft turbojet engine.

BACKGROUND

In a known manner, an aircraft comprises one or more turbojet engines configured to enable its propulsion from the acceleration of an air flow circulating from upstream to downstream in each turbojet engine during a thrust phase, designated inner air flow. Hereafter, the terms "upstream" and "downstream" are defined with respect to the direction of circulation of the inner air flow during a thrust phase.

In a known manner, with reference to FIG. 1, an aircraft bypass turbojet engine TAA is represented extending along a longitudinal axis X and comprising a fan 500 rotationally mounted around the longitudinal axis X and configured, during a thrust phase P1 of the turbojet engine TAA, to accelerate the inner air flow F-INT. The turbojet engine TAA also comprises downstream of the fan 500 a primary radially inner flow path 600 and a secondary radially outer flow path 700 which are separated by a casing 800. The casing 800 is configured to guide a first part of the inner air flow F-INT, designated primary air flow F1, in the primary flow path 600 for the combustion of the fuel and a second part of the inner air flow F-INT, designated secondary air flow F2, in the secondary flow path 700 in order to generate the thrust of the turbojet engine TAA. Hereafter, the terms "inner" and "outer" are defined along the radial direction with respect to the longitudinal axis X.

In a known manner, still with reference to FIG. 1, an aircraft propulsion assembly EAA is represented which comprises a turbojet engine TAA and a nacelle 200 extending around the longitudinal axis X of the turbojet engine TAA in a radially outward manner to the fan 500 and delimiting in a radially outward manner the secondary flow path 700. The nacelle 200 comprises at its upstream end an air inlet 300 and at its downstream end an air outlet 400. The air inlet 300 comprises an upstream inner wall 310 turned towards the longitudinal axis X and an upstream outer wall 320 opposite to the upstream inner wall 310, connected together upstream by an inlet air lip 330 comprising a leading edge. The air inlet 300 has a rounded aerodynamic profile which makes it possible to separate an upstream air flow F into the inner air flow F-INT guided by the upstream inner wall 310 and an outer air flow F-EXT guided by the upstream outer wall 320.

In a known manner and analogous to the air inlet 300, still with reference to FIG. 1, the air outlet 400 of the nacelle 200 comprises a downstream inner wall 410 turned towards the longitudinal axis X and a downstream outer wall 420 opposite to the downstream inner wall 410, connected together downstream by a trailing edge 430. The air outlet 400 comprises a profile tapering downstream which makes it possible to guide the secondary air flow F2 of the secondary flow path 700 towards the exterior of the turbojet engine TAA.

To reduce the braking distance of an aircraft, notably during landing, it is known to integrate in a nacelle 200 a thrust reversal system which makes it possible to modify the orientation of the secondary air flow F2 at the exhaust so as to realize a reverse thrust phase. In a known manner, the reverse thrust phase may be realized by obstructing at least partially the secondary flow path 700, downstream of the fan 500, in order to re-conduct the secondary air flow to the exterior of the turbojet engine TAA upstream, such as illustrated in FIGS. 1 to 7 of the patent application FR2120172A1, notably by uncovering grids housed in the nacelle 200. However, for a turbojet engine $T_{AA}$ with high bypass ratio notably, that is to say of which the ratio of the mass of the secondary air flow F2 over the mass of the primary air flow F1 is greater than 16, the nacelle 200 comprises an important diameter and it is not desirable to integrate such a thrust reversal system given that it would penalize considerably the mass, the bulk and the drag of the turbojet engine $T_{AA}$.

Another solution for reducing the braking distance of an aircraft consists in providing a variable pitch fan (VPF) 500. Such a fan 500 comprises vanes of which the pitch angle is controlled so as to make it possible to reverse the direction of circulation of the secondary air flow F2 in the secondary flow path 700 enabling the deceleration of the aircraft, notably during landing.

With reference to FIG. 2A, during a reverse thrust phase P2, a reverse air flow F-INV withdrawn from the outer air flow F-EXT is admitted at the level of the trailing edge 430 of the air outlet 400 of the nacelle 200 and circulates from downstream to upstream in the secondary flow path 700, that is to say inversely to the secondary air flow F2 of FIG. 1. The reverse air flow F-INV coming from the secondary flow path 700 next traverses the fan 500 and is guided upstream by the upstream inner wall 310 of the air inlet 300. The reverse air flow F-INV then opposes the upstream air flow F, notably in a radially outward manner in the proximity of the nacelle 200, which enables braking. In the same way as in thrust phase P1, an inner air flow F-INT coming from the upstream air flow F circulates from upstream to downstream at the root of the fan 500, that is to say in a radially inwards manner and in opposite direction with respect to the reverse air flow F-INV, in order to supply the primary air flow F1. The primary air flow F1 may also be supplied by a part of the reverse air flow F-INV which bypasses the casing 800.

In practice, as illustrated in FIGS. 2A and 2B, the vanes of the fan 500 drive the reverse air flow F-INV according to a twisted motion V of longitudinal axis X at the level of the air inlet 300. Such a twisted motion V is liable to be transmitted to the outer air flow F-EXT guided by the upstream outer wall 320 of the air inlet 300 and flowing from upstream to downstream along the nacelle 200. The outer air flow F-EXT is next withdrawn at the level of the air outlet 400 of the nacelle 200 to form the reverse air flow F-INV. The reverse air flow F-INV admitted into the secondary flow path 700 thus also comprises a twisted motion V' transmitted by the outer air flow F-EXT, which is not optimal because it reduces the reverse thrust performances.

Furthermore, still with reference to FIGS. 2A and 2B, the tapered profile of the air outlet 400, aerodynamic in thrust phase P1, generates in a reverse thrust phase P2 recirculation zones R in the secondary flow path 700 at the level of the air outlet 400. More precisely, the outer air flow F-EXT coming from upstream detaches from the downstream outer wall 420 and bypasses the trailing edge 430 to enter into the air outlet 400 and form the reverse air flow F-INV. Such recirculation zones R reduce the quantity of reverse air flow F-INV admitted into the air outlet 400, which reduces the reverse thrust performances.

In another field, that of airships, it is known from the U.S. Pat. No. 5,516,061 to provide a plurality of propellors mounted in shrouds. Each propeller receives torque from an engine mounted in a main body of the airship. Such an airship thus does not comprise a turbojet engine, even less a bypass turbojet engine. To increase the quantity of reverse air flow in the casing of the propellor, from FIG. 3 is known an air outlet comprising radial apertures spread out angularly along a transversal plane of the air outlet situated upstream of the trailing edge. In each aperture, a shutter is pivotally mounted between a closed position, in which the shutter entirely fills said aperture, and an open position, in which the shutter extends projecting inwards. The open position makes it possible to admit the reverse air flow via the aperture in addition to the trailing edge to favor the reverse thrust phase whereas the closed position makes it possible to maintain the performances in thrust phase. Such a shutter has however the drawback of being bulky and of increasing the on-board mass.

In an alternative manner, it is known from FIG. 5 of the same patent to add secondary radial apertures emerging internally in the radial apertures described previously and externally upstream thereof. A flap is pivotally mounted at the level of the outer open face of each secondary radial aperture. This alternative has the same drawbacks as the preceding embodiment.

It is also known from FIGS. 7 and 8 of the same patent to replace the shutter by two cooperating half-flaps pivotally mounted inwards at the level of the outer and inner open faces of the aperture. The outer half-flaps are mounted along a longitudinal axis whereas the inner half-flaps are mounted along a tangential axis. Such cooperating half-flaps may however have poor sealing in closed position and are more bulky and difficult to handle than simple flaps.

In another field, that of aircraft propulsion assemblies with low bypass ratio, free of vanes for guiding the secondary flow and with late separation of the primary flow path and the secondary flow path. It is known from the patent application GB 1360238A to form a circumferential aperture in the wall of the nacelle. Outer doors and inner doors, radially offset, close the circumferential aperture in a complex and bulky manner. It is also known from the patent application FR2162257A1 to form through windows in the wall of the nacelle upstream of the secondary flow path. This makes it possible to increase the air flow circulating in the primary flow path, without effect on the reverse thrust phase.

The invention thus targets an air outlet for a nacelle for an aircraft bypass turbojet engine making it possible to increase the performances of the turbojet engine during a reverse thrust phase, without reducing the thrust performances.

SUMMARY

The invention relates to an air outlet for a nacelle for an aircraft bypass turbojet engine extending along a longitudinal axis, said turbojet engine comprising a primary radially inner flow path and a secondary radially outer flow path in which a secondary air flow circulates from upstream to downstream during a thrust phase and a reverse air flow from downstream to upstream during a reverse thrust phase, said nacelle extending around the longitudinal axis of the turbojet engine and comprising at its downstream end the air outlet, said air outlet comprising a downstream inner wall, turned towards the longitudinal axis and configured to delimit externally the secondary flow path and to guide the secondary air flow and the reverse air flow, and a downstream outer wall, opposite to the downstream inner wall and configured to guide an outer air flow circulating from upstream to downstream, said downstream inner wall and said downstream outer wall being connected together downstream by a trailing edge.

The invention is remarkable in that the air outlet comprises:

at least one radial through aperture extending over an angular portion of the air outlet along a transversal plane situated upstream of the trailing edge, said radial through aperture comprising an inner open face formed in the downstream inner wall and an outer open face formed in the downstream outer wall, and for each radial through aperture, a single guiding device comprising a single inner moveable member and a single outer moveable member mounted respectively at the level of the inner open face and the outer open face, which are moveable between:

a closed position in which the inner moveable member closes off the inner open face in the extension of the downstream inner wall and the outer moveable member closes off the outer open face in the extension of the downstream outer wall, said radial through aperture defining a closed cavity delimited by the inner moveable member and the outer moveable member, in order to conserve the performances in thrust phase, and an open position in which the inner moveable member and the outer moveable member are configured to allow the outer air flow to circulate in the radial through aperture from the outer open face to the inner open face in order to increase the reverse air flow admitted into the secondary flow path, so as to favor a reverse thrust phase.

Thanks to the invention, during a reverse thrust phase, the reverse air flow is admitted into the secondary flow path both at the level of the trailing edge and at the level of each radial through aperture. The reverse air flow admitted into the secondary flow path is thus increased, which favors the reverse thrust phase. In addition, each radial through aperture generates a phenomenon of sucking up the outer air flow at the level of the outer open face, i.e. a local over-pressure and, at the level of the inner open face, a local under-pressure, at the origin of drag. This, combined with the action of the guiding device, favors a pressing of the outer air flow against the downstream outer wall, which improves the admission of the reverse air flow into the secondary flow path. Indeed, the reverse air flow admitted not just at the level of the trailing edge but also at the level of each radial through aperture has a recirculation and a twisted motion significantly reduced compared to the prior art. Each guiding device and each radial through aperture thus act against the twisted motion of the outer air flow generated upstream by the variable pitch fan.

Each guiding device further has the advantage of being not very bulky and of limited on-board mass compared to the prior art, only comprising one inner moveable member and one outer moveable member which are not configured to fill the radial through aperture in closed position, but to close it off at the level of the inner and outer open faces so as to form a closed cavity. Further, in closed position, each inner and outer moveable member extends into the extension of the downstream inner wall and the downstream outer wall, which makes it possible not to modify the profile of the air outlet and thus to conserve the performances in thrust phase.

According to one aspect, the air outlet comprises a plurality of radial through apertures spread out on the circumference of the air outlet. Preferably, the radial through apertures are spread out along a same transversal plane situated upstream of the trailing edge. Further preferably, the radial through apertures are evenly spread out on the circumference of the air outlet. In an advantageous manner, the distribution, the number and the size of the radial through apertures act directly on the desired intensity of the reverse thrust phase and on its homogeneous or conversely heterogeneous character, more accentuated on certain defined angular portions.

According to a preferred aspect, the air outlet comprises at least ten guiding devices, preferably at least thirty guiding devices, further preferably at the most fifty guiding devices, to admit a sufficient reverse air flow into the secondary flow path and efficiently correct the flow of the outer air flow. In other words, the air outlet comprises at least ten radial through apertures, preferably at least thirty, further preferably at the most fifty.

Preferably, each radial through aperture is axially positioned between the axial position of the guide vanes of the secondary flow of the turbojet engine (known to those skilled in the art by the designation OGV) and that of the trailing edge of the air outlet of the nacelle. In a preferred manner, the axial length of a through aperture is at the most equal to 90% of the axial length defined between the axial position of the guide vanes of the secondary flow and that of the trailing edge of the air outlet. This makes it possible to admit a sufficient reverse air flow into the secondary flow path and to efficiently correct the flow of the outer air flow.

According to a first aspect of the invention, at least two radial through apertures are distant from one another, preferably all of the radial through apertures are distant from one another, preferentially evenly distant. In an advantageous manner, such an air outlet has great mechanical strength in an environment subjected to vibrations and to turbulence. Further, the inner moveable member and the outer moveable member delimit a closed cavity sealed in closed position, which guarantees the performances in thrust phase.

According to one second aspect of the invention, at least two radial through apertures are adjacent, preferably all of the radial through apertures are adjacent, preferentially the radial through apertures form together an annular through aperture. In an advantageous manner, such an air outlet enables an optimal reverse thrust phase by admitting an optimal reverse air flow and by efficiently reducing recirculation at the level of the trailing edge, as well as the twisted motion of the admitted reverse air flow.

According to a preferred aspect, the inner moveable member and the outer moveable member of at least one same guiding device have substantially identical shapes, and preferably substantially identical sizes, that is to say that the shape and the size of the inner moveable member differ at the most by 10% from those of the outer moveable member. Advantageously, the inner moveable member and the outer moveable member may be controlled in an identical manner, and thus in a simple and practical manner. Preferably, the outer open face and the inner open face have adjacent sections.

Preferably, at least one inner moveable member has a flattened shape and is preferentially in the form of a flap. Also preferably, at least one outer moveable member has a flattened shape and is preferentially in the form of a flap. Preferably, the flap comprises a radial thickness less than one third of the local radial thickness of the air outlet, preferentially less than one quarter of the local radial thickness of the air outlet. Advantageously, such an inner moveable member and such an outer moveable member have a limited mass and bulk.

According to a first aspect, the inner moveable member is slidingly mounted on the downstream inner wall of the air outlet. Preferably, the outer moveable member is slidingly mounted on the downstream outer wall of the air outlet. Such a sliding mounting advantageously has a very small bulk and does not perturb the outer air flow in open position.

Preferably, in open position, the inner moveable member of at least one guiding device extends upstream of the inner open face, preferably externally to the downstream inner wall. Also preferably, in open position, the outer moveable member extends upstream of the outer open face, preferably internally to the downstream outer wall. The bulk is advantageously minimal. A positioning upstream in open position is advantageous given that the actuating means are preferably positioned upstream of the air outlet.

According to one second aspect, the inner moveable member of at least one guiding device is pivotally mounted along a pivoting axis tangential to the air outlet. Preferably, the outer moveable member is pivotally mounted along a pivoting axis tangential to the air outlet. Advantageously, such an inner moveable member and such an outer moveable member make it possible to guide the outer air flow to the secondary flow path, while efficiently reducing the twisted motion that it has.

According to one aspect, in open position, the inner moveable member extends projecting inwards with respect to the longitudinal axis and, preferably, the pivoting axis is situated downstream of the inner open face. Preferably, in open position, the inner moveable member extends projecting along a deployment angle comprised between 0° and 180° with respect to the closed position.

According to one aspect, the deployment angle is comprised between 30° and 60°, for an optimal guiding of the outer air flow in the secondary flow path. In an advantageous manner, the inner moveable member makes it possible to guide the outer air flow coming from the through aperture to upstream, which improves the reverse thrust performances. According to another aspect, the deployment angle is greater than 150°, for a minimum bulk in the secondary flow path. The inner moveable member only extends slightly projecting into the secondary flow path.

According to a preferred aspect, the outer moveable member extends projecting outwards with respect to the longitudinal axis and, preferably, the pivoting axis is situated downstream of the outer open face. Preferably, in open position, the outer moveable member extends projecting along a deployment angle comprised between 0° and 180° with respect to the closed position.

According to one aspect, the deployment angle is comprised between 30° and 60°, for an optimal guiding of the outer air flow in the radial through aperture. Indeed, such a positioning of the outer moveable member advantageously makes it possible to turn down the air flow in the through aperture in order to increase the flow rate in said through aperture. The outer moveable member thus makes it possible to scoop the outer air flow. According to another aspect, the deployment angle is greater than 150°, for an optimal pressing of the outer air flow on the downstream outer wall.

According to another aspect, in open position, the inner moveable member extends into the radial through aperture outwards with respect to the longitudinal axis and, preferably, is mounted along a pivoting axis situated upstream of the inner open face. According to another preferred aspect, in open position, the outer moveable member extends into the radial through aperture inwards with respect to the longitudinal axis and, preferably, is mounted along a pivoting axis situated upstream of the outer open face. The bulk is thus minimal and the moveable members remain in the radial thickness of the air outlet. Such a pivoting thus makes it possible not to perturb the flow of the outer air flow at the level of the downstream outer wall. In open position, the outer air flow circulates in the through aperture while bypassing the moveable members.

Preferably, in open position, the inner moveable member and the outer moveable member touch each other, preferably by their downstream end, so as to form an aerodynamic upstream wall for the circulation for the outer air flow within the radial through aperture. In open position, the moveable members form together a guide for the air flow.

According to one aspect, the inner moveable member and the outer moveable member of at least one same guiding device are moveably mounted in a symmetrical manner with respect to an axis of symmetry passing through the trailing edge and through the center of the radial through aperture associated with said guiding device, the center of the radial through aperture being here defined with respect to an axis radial to the longitudinal axis. Thus, if the inner moveable member is displaced by sliding, the outer moveable member also and reciprocally. Similarly, if the inner moveable member is displaced by pivoting, the outer moveable member also and reciprocally. In addition, if the inner moveable member is displaced inwards, the outer moveable member is displaced outwards and reciprocally. Finally, if the inner moveable member is displaced upstream, the outer moveable member also and reciprocally. Such a guiding device may advantageously be controlled in a simple and practical manner and makes it possible to obtain analogous aerodynamic behaviors on either side of the through aperture, which improves the circulation of the air flow.

According to another aspect, at least one guiding device comprises at least one perforated member positioned in the radial through aperture associated with said guiding device. Preferably, the perforated member is in the form of a grid comprising a plurality of bladings, or instead in the form of fins. Advantageously, such a perforated member contributes to reducing the twisted motion of the reverse air flow and to guide it during its admission into the secondary flow path.

Preferably, at least one perforated member is positioned at the level of the outer open face and/or at the level of the inner open face and/or at the center of a radial through aperture, so as to limit the bulk while efficiently reducing the twisted motion of the admitted reverse air flow.

The invention also relates to a nacelle for an aircraft bypass turbojet engine extending along a longitudinal axis, said turbojet engine comprising a primary radially inner flow path and a secondary radially outer flow path in which a secondary air flow circulates from upstream to downstream during a thrust phase and a reverse air flow from downstream to upstream during a reverse thrust phase, said nacelle extending around the longitudinal axis of the turbojet engine and comprising at its downstream end an air outlet such as described previously.

The invention further relates to an aircraft propulsion assembly comprising an aircraft bypass turbojet engine comprising a primary radially inner flow path and a secondary radially outer flow path in which a secondary air flow circulates from upstream to downstream during a thrust phase and a reverse air flow from downstream to upstream during a reverse thrust phase, said propulsion assembly comprising a nacelle such as described previously mounted on the turbojet engine. Preferably, the turbojet engine comprises a variable pitch fan. Also preferably, the turbojet engine comprises a bypass ratio greater than 16.

Advantageously, the air outlet described previously makes it possible to increase the reverse air flow admitted into the secondary flow path and to press the outer air flow against the downstream outer wall to improve its admission, and does so even for an air outlet of large diameter. The reversal of thrust in the case of an air outlet of large diameter is advantageously realized with a variable pitch fan, which does not penalize the mass of the turbojet engine.

The invention furthermore relates to a method for using an aircraft propulsion assembly such as described previously, wherein the inner moveable member and the outer moveable member of at least one guiding device of the air outlet are in closed position during a thrust phase of the turbojet engine, the method comprising, during a reverse thrust phase of said turbojet engine, at least one step of displacement of said inner moveable member and of said outer moveable member from the closed position to the open position.

The invention in addition relates to a method for using an aircraft propulsion assembly such as described previously, wherein the inner moveable member and the outer moveable member of at least one guiding device of the air outlet are in open position during a reverse thrust phase of the turbojet engine, the method comprising, during a thrust phase of said turbojet engine, at least one step of displacement of said inner moveable member and of said outer moveable member from the open position to the closed position.

In an advantageous manner, such a method for using makes it possible to adapt, in a simple, practical and rapid manner, an air outlet so that it comprises an aerodynamic profile both in thrust phase and in reverse thrust phase.

Preferably, at least one guiding device comprises at least one member for displacing the inner moveable member and at least one member for displacing the outer moveable member from the closed position to the open position and preferably from the open position to the closed position.

Preferably, a same displacement member is configured to displace the inner moveable member and the outer moveable member of a same guiding device. Further preferably, a same displacement member is configured to displace the inner moveable member and the outer moveable member of each guiding device, to facilitate the control of each guiding device while limiting the bulk and the mass.

BRIEF DESCRIPTION OF THE DRAWINGS

The invention will be better understood on reading the description that follows, given uniquely as an example, and by referring to the appended drawings given as non-limiting examples, in which identical references are given to similar objects and in which.

It should be noted that the figures set out the invention in a detailed manner for implementing the invention, said figures obviously being able to serve to better define the invention if needs be.

DETAILED DESCRIPTION

Figure 1:
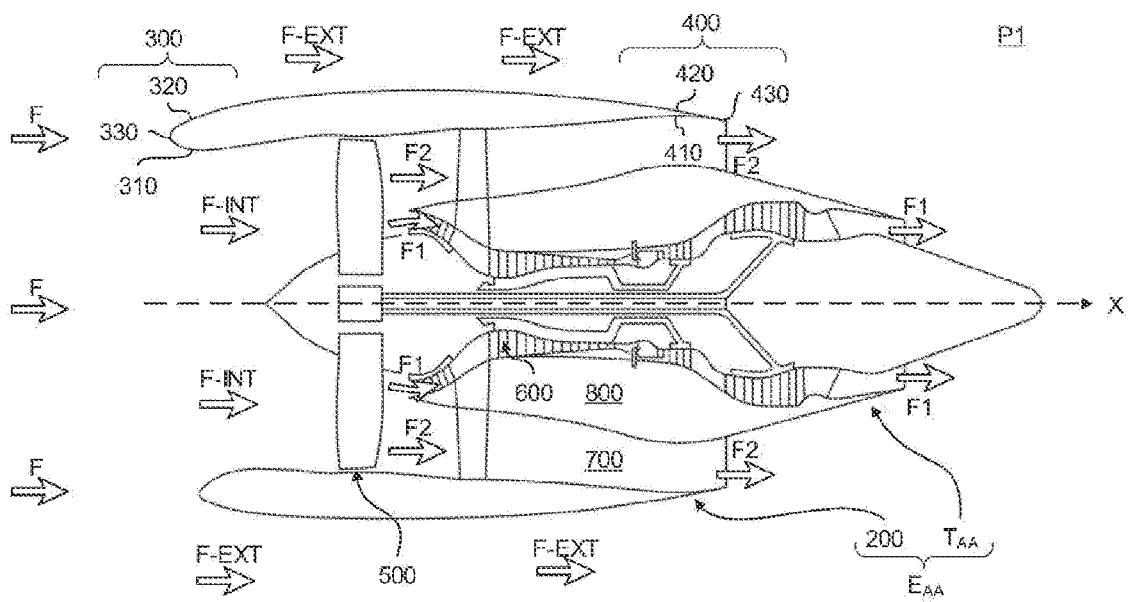
FIG. 1 is a schematic longitudinal representation of an aircraft propulsion assembly during a thrust phase.
Figure 2A:
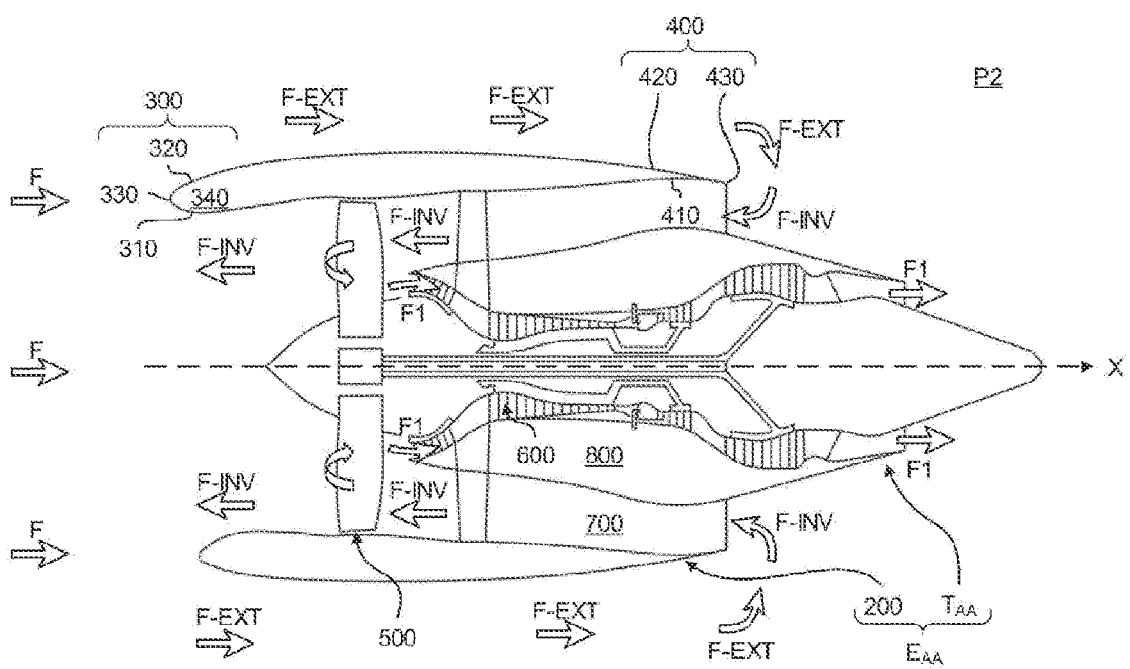
FIG. 2A is a schematic longitudinal representation of the aircraft propulsion assembly of FIG. 1 during a reverse thrust phase.
Figure 2B:
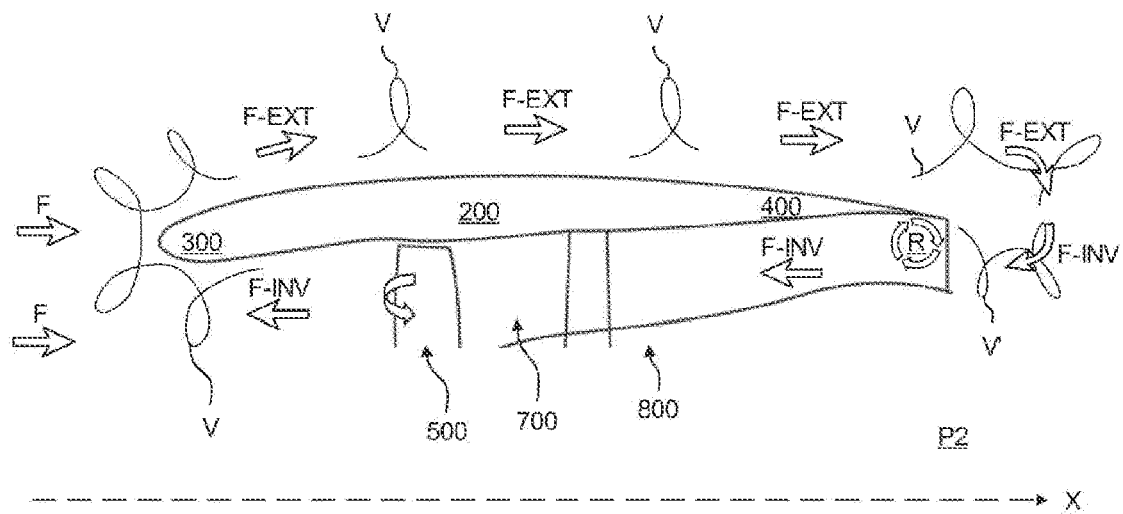
FIG. 2B is a schematic representation in longitudinal half-section of the nacelle of the aircraft propulsion assembly of FIG. 1 during a reverse thrust phase.
Figure 3A:
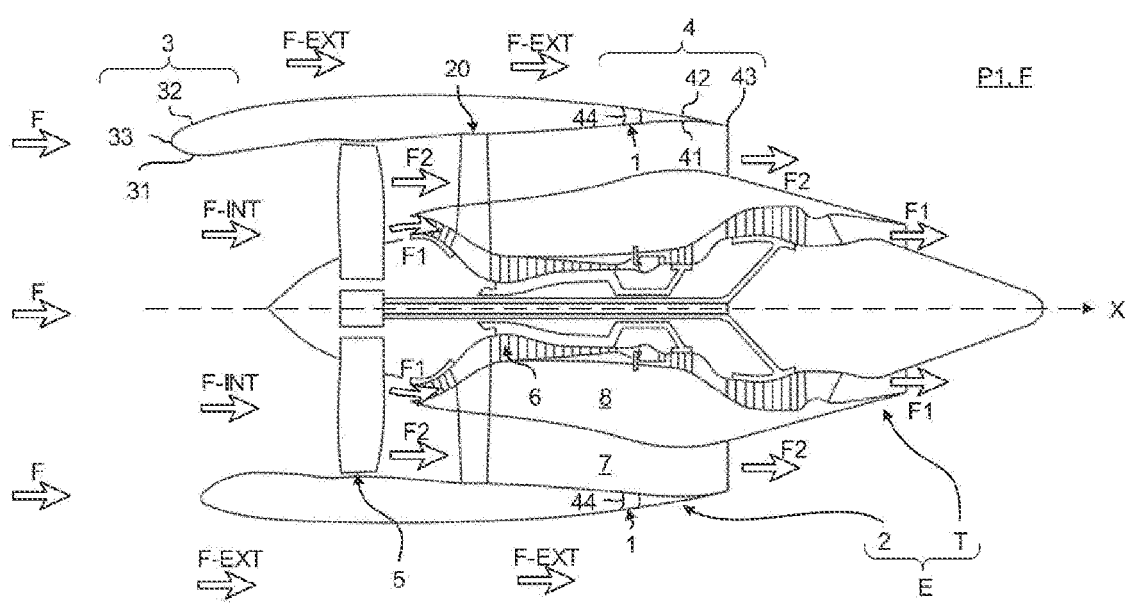
FIG. 3A is a schematic longitudinal representation of an aircraft propulsion assembly during a thrust phase according to one embodiment of the invention.

With reference to FIG. 3A and as described in the preamble, an aircraft propulsion assembly E is represented comprising an aircraft bypass turbojet engine T extending along a longitudinal axis X and configured to enable the propulsion of an aircraft from the acceleration of an air flow circulating from upstream to downstream in each turbojet engine T during a thrust phase P1, designated inner air flow F-INT. Hereafter, the terms "upstream" and "downstream" are defined with respect to the direction of circulation of the inner air flow F-INT during a thrust phase P1. The turbojet engine T comprises a fan 5 rotationally mounted around the longitudinal axis X and configured, during a thrust phase P1 of the turbojet engine T, to accelerate the inner air flow F-INT. The turbojet engine T also comprises downstream of the fan 5 a primary radially inner flow path 6 and a secondary radially outer flow path 7 which are separated by a casing 8. The casing 8 is configured to guide a first part of the inner air flow F-INT, designated primary air flow F1, in the primary flow path 6 for the combustion of the fuel and a second part of the inner air flow F-INT, designated secondary air flow F2, in the secondary flow path 7 in order to generate the thrust of the turbojet engine T. Hereafter, the terms "inner" and "outer" are defined according to the radial direction with respect to the longitudinal axis X.

Figure 4A:
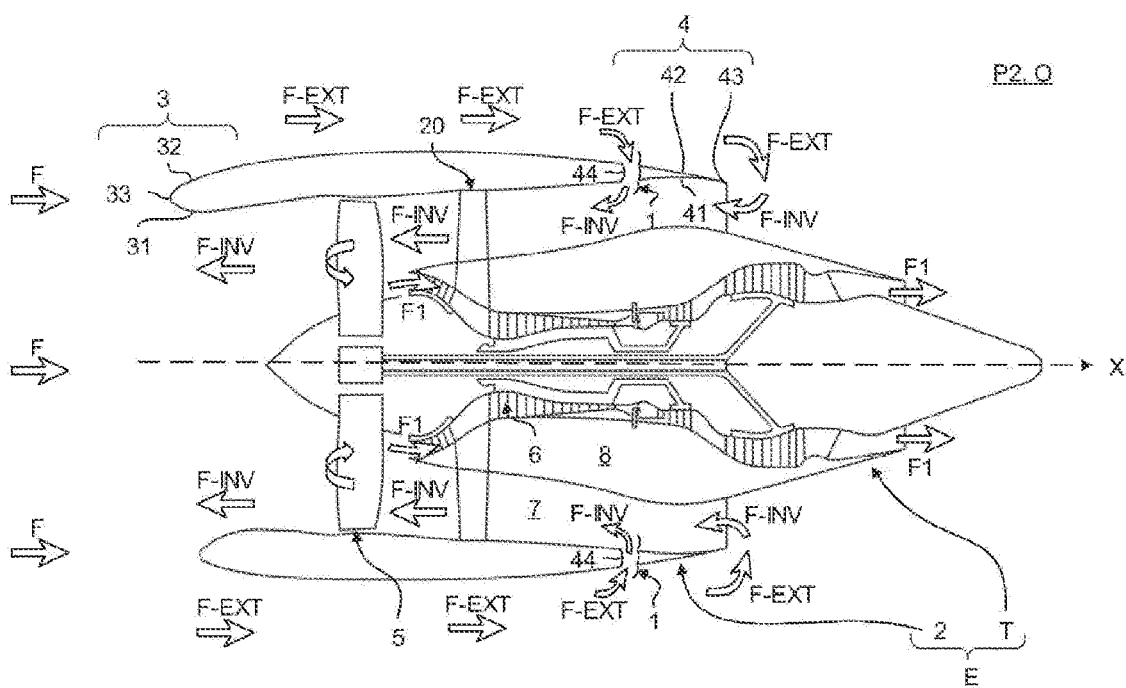
FIG. 4A is a schematic longitudinal representation of an aircraft propulsion assembly during a reverse thrust phase according to a first embodiment of the invention.

It will be considered hereafter that the turbojet engine T has a high bypass ratio, that is to say that the ratio of the mass of the secondary air flow F2 over the mass of the primary air flow F1 is greater than 16, and that the fan 5 is a variable pitch fan, known by the acronym, VPF. As illustrated in FIG. 4A, such a fan 5 is configured to enable a reverse thrust phase P2 enabling the deceleration of the aircraft, notably during landing. To do so, the fan 5 comprises vanes of which the pitch angle is adjustable so as to make it possible to reverse the direction of circulation of the secondary air flow F2 in the secondary flow path 7. During a reverse thrust phase P2, a reverse air flow F-INV thus circulates from downstream to upstream in the secondary flow path 7, that is to say in the opposite direction to the secondary air flow F2 of FIG. 3A. The reverse air flow F-INV next traverses the fan and opposes an upstream air flow F, notably in a radially outer manner, which enables braking. In the same way as in thrust phase P1, an inner air flow F-INT coming from the upstream air flow F circulates from upstream to downstream at the root of the fan 5, that is to say in a radially inner manner and in opposite direction with respect to the reverse air flow F-INV, in order to supply the primary air flow F1. The primary air flow F1 may also be supplied by a part of the reverse air flow F-INV which bypasses the casing 8.

With reference to FIGS. 3A and 4A, the aircraft propulsion assembly E further comprises a nacelle 2 mounted on the turbojet engine T and extending around the longitudinal axis X of the turbojet engine T in a radially outer manner to the fan 5 and delimiting in a radially outer manner the secondary flow path 7. As illustrated in FIG. 3A, the turbojet engine T also comprises guide vanes 20, known by those skilled in the art as outlet guide vanes (OGV), extending radially into the secondary flow path 7 of the casing 8 of the turbojet engine T. The nacelle 2 comprises at its upstream end an air inlet 3 and at its downstream end an air outlet 4. The air inlet 3 comprises an upstream inner wall 31 turned towards the longitudinal axis X and an upstream outer wall 32 opposite to the upstream inner wall 31, connected together upstream by an inlet air 33 comprising a leading edge.

As illustrated in FIG. 3A, in thrust phase P1, the air inlet 3 comprises a rounded aerodynamic profile which makes it possible to separate an upstream air flow F into an inner air flow F-INT guided by the upstream inner wall 31 and an outer air flow F-EXT guided by the upstream outer wall 32. In reverse thrust phase P2, as illustrated in FIG. 4A, the upstream inner wall 31 of the air inlet 3 is configured to guide upstream the reverse air flow F-INV having traversed successively the secondary flow path 7 and the fan 5, so that it opposes the upstream air flow F, which enables braking. At the level of the air inlet 3, the reverse air flow F-INV guided by the upstream inner wall 31 has a twisted motion V of longitudinal axis X generated by the vanes of the fan 5. Such a twisted motion V may be transmitted to the outer air flow F-EXT guided by the upstream outer wall 32 of the air inlet 3 and flowing from upstream to downstream along the nacelle 2.

Figure 3B:
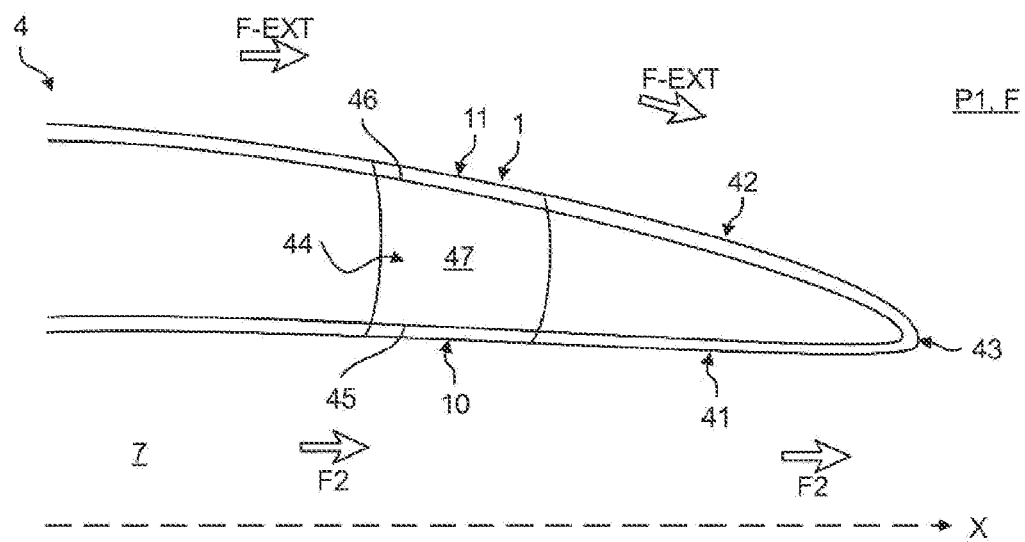
FIG. 3B is a schematic representation in longitudinal half-section of the air outlet of the aircraft propulsion assembly of FIG. 3A during a thrust phase in which the moveable members are in closed position according to one embodiment of the invention.
Figure 4B:
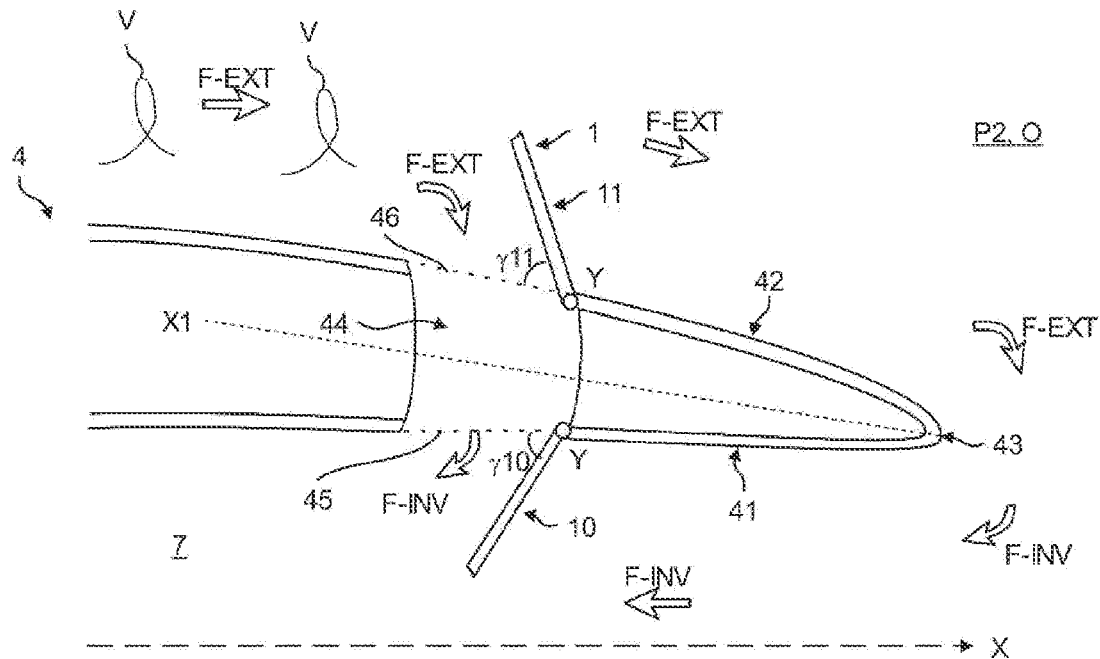
FIG. 4B is a schematic representation in longitudinal half-section of the air outlet of the aircraft propulsion assembly of FIG. 4A during a reverse thrust phase in which the moveable members are in open position according to a first embodiment of the invention.

The invention more particularly relates to the air outlet 4 of the nacelle 2, which, in a manner analogous to the air inlet 3 and with reference to FIGS. 3B and 4B, comprises a downstream inner wall 41 turned towards the longitudinal axis X and a downstream outer wall 42 opposite to the downstream inner wall 41, connected together downstream by a trailing edge 43.

According to the invention, still with reference to FIGS. 3B and 4B, the air outlet 4 further comprises:

one or more radial through aperture(s) 44 extending over an angular portion of the air outlet 4 along a transversal plane situated upstream of the trailing edge 43, each radial through aperture 44 comprising an inner open face 45 formed in the downstream inner wall 41 and an outer open face 46 formed in the downstream outer wall 42, and for each radial through aperture 44, a single guiding device 1 comprising a single inner moveable member

10 and a single outer moveable member 11 mounted respectively at the level of the inner open face 45 and the outer open face 46, which are moveable between a closed position F, suited for a thrust phase P1 of the turbojet engine T and illustrated in FIG. 3B, and an open position O, suited for a reverse thrust phase P2 and illustrated in FIGS. 4B, 6, 7 and 8.

According to the invention and with reference to FIG. 3B, in closed position F, the inner moveable member 10 closes off the inner open face 45 in the extension of the downstream inner wall 41 and the outer moveable member 11 closes off the outer open face 46 in the extension of the downstream outer wall 42. The radial through aperture 44 associated with the guiding device 1 then defines a closed cavity 47 delimited on the one hand by the inner moveable member 10 and on the other hand by the outer moveable member 11. The inner moveable member 10 and the outer moveable member 11 of a guiding device 1 are in addition radially aligned with respect to the longitudinal axis X in closed position F.

As will be described in the next embodiments of FIGS. 4B, 6, 7 and 8, in open position O, the inner moveable member 10 and the outer moveable member 11 are configured to allow the outer air flow F-EXT to circulate in the radial through aperture 44 from the outer open face 46 to the inner open face 45 to rejoin the secondary flow path 7. The radial direction of the through aperture 44 favors the admission of the outer air flow F-EXT.

In practice, each guiding device 1 further comprises a member for displacing (not represented) the inner moveable member 10 and the outer moveable member 11 from the closed position F to the open position O and vice versa. Preferably, a same displacement member controls the inner moveable member 10 and the outer moveable member 11 of a same guiding device 1. Preferentially, all of the guiding devices 1 are controlled by a same displacement member for a simple and practical control. Preferably, the displacement member is positioned upstream of the through aperture, the bulk being less constrained and the activation easier.

Such an air outlet 4 comprising one or more radial through aperture(s) 44 equipped with a guiding device 1 has the advantage of having an aerodynamic profile and suited both for a thrust phase P1 and a reverse thrust phase P2 of the turbojet engine T.

Indeed, during a thrust phase P1, the inner moveable member 10 and the outer moveable member 11 in closed position F extend into the extension of the downstream inner wall 41 and the downstream outer wall 42 of the air outlet 4 respectively. The air outlet 4 thus conserves an aerodynamic profile identical to that of the prior art enabling the downstream outer wall 42 to guide the outer air flow F-EXT and the downstream inner wall 41 to guide the secondary flow F2 from upstream to downstream in the secondary flow path 7. The air outlet 4 also conserves an on-board mass substantially identical to that of the prior art because each radial through aperture 44 is closed off to form a closed cavity 47 and not filled. The inner moveable member 10 and the outer moveable member 11 do not extend into the through aperture 44 in closed position F. The performances in thrust phase P1 are thus advantageously conserved.

During a reverse thrust phase P2, the inner moveable member 10 and the outer moveable member 11 in open position O make it possible to admit the reverse air flow F-INV into the secondary flow path 7 both at the level of the trailing edge 43 and at the level of each radial through aperture 44. The reverse air flow F-INV admitted into the secondary flow path 7 is thus increased which improves the performances in reverse thrust phase P2. The reverse air flow F-INV next circulates from downstream to upstream up to the fan 5 which confers on it a twisted motion V. The reverse air flow F-INV next bypasses the air inlet 3 to rejoin the outer air flow F-EXT, while transmitting thereto its twisted motion V. In an advantageous manner, such a twisted motion V is transmitted in a significantly reduced manner to the reverse air flow F-INV admitted at the level of the trailing edge 43 and each radial through aperture 44. Indeed, each radial through aperture 44 and each guiding device 1 cooperate to guide the outer air flow F-EXT, on the one hand by pressing it against the downstream outer wall 42 and on the other hand by limiting recirculation in the secondary flow path 7. The performances in reverse thrust phase P2 are thus improved compared to the prior art, via a reverse air flow F-INV admitted in greater quantity and along a direction of flow substantially longitudinal without presence of recirculation.

The structural and functional characteristics of the radial through apertures 44 of the air outlet 4 will be described more precisely hereafter.

Figure 5A:
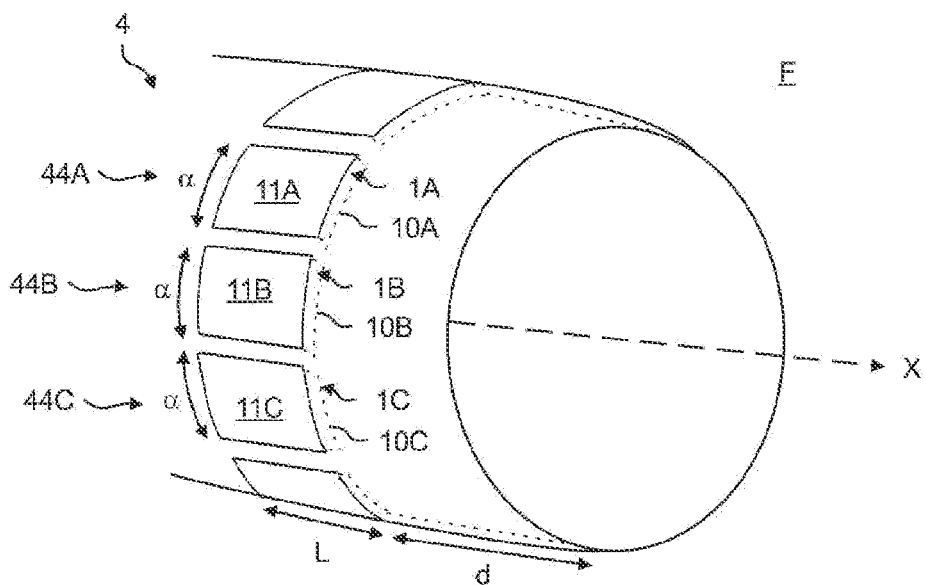
FIG. 5A.
Figure 5B:
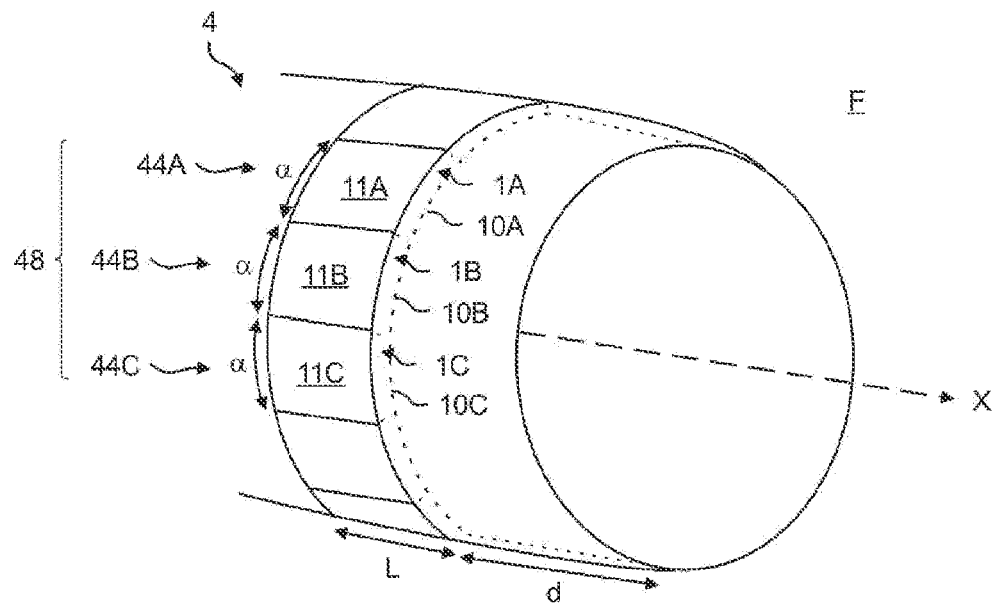
FIG. 5B.
Figure 5C:
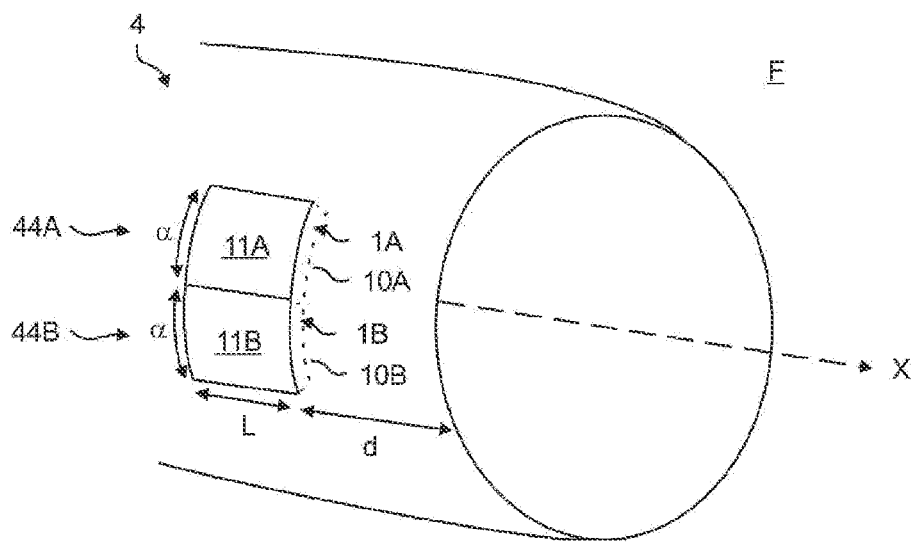
FIG. 5C are three schematic representations in perspective of the nacelle of the aircraft propulsion assembly of FIG. 3A during a thrust phase with guiding devices according to respectively three alternative embodiments of the invention.

With reference to FIGS. 5A, 5B and 5C and as described previously, the air outlet 4 comprises one or more radial through aperture(s) 44A, 44B, 44C each extending over an angular portion a of the air outlet 4 along a transversal plane situated upstream of the trailing edge 43. In practice, the number, the distribution and the size of the radial through apertures 44A, 44B, 44C depend on the intensity and the desired homogeneous or heterogeneous character of the reverse thrust phase P2. Three embodiments of the invention are here chosen to be described as non-limiting examples and suitable for three different types of reverse thrust phase P2.

According to a first embodiment of the invention illustrated in FIG. 5A, the air outlet 4 comprises ten radial through apertures 44A, 44B, 44C evenly spaced apart on the circumference of the air outlet 4 and along a same transversal plane. Such an air outlet 4 advantageously makes it possible to admit and to guide the reverse air flow F-INV in a homogeneous manner over the entire circumference of the air outlet 4. The radial through apertures 44A, 44B, 44C are furthermore distant from one another to increase the mechanical strength of the air outlet 4 in an environment subjected to vibrations and to turbulence.

According to a second embodiment of the invention illustrated in FIG. 5B, the air outlet 4 comprises twelve radial through apertures 44A, 44B, 44C adjacent to one another and forming together a global annular through aperture 48 of longitudinal axis X. Such an annular through aperture 48 is advantageously suited for a homogeneous reverse thrust phase P2 with optimal performances, notably for turbojet engines T with bypass ratio greater than 16.

According to a third embodiment of the invention illustrated in FIG. 5C, the air outlet 4 only comprises two radial through apertures 44A, 44B adjacent on a given portion of the circumference of the air outlet. Such an air outlet 4 is suited for a heterogeneous reverse thrust phase P2, by locally increasing the performances at the level of the given portion of the air outlet 4 covered by the radial through apertures 44A, 44B.

It should be noted that it goes without saying that the number of radial through apertures 44A, 44B, 44C could be different from that of FIGS. 5A, 5B and 5C. In the example of an aircraft bypass turbojet engine T with bypass ratio greater than 16, the air outlet 4 preferably comprises at least ten radial through apertures 44A, 44B, 44C, further preferably at least thirty and at the most fifty radial through apertures 44A, 44B, 44C, to increase efficiently the quantity of reverse air flow F-INV admitted and to straighten it efficiently along a substantially longitudinal direction.

Still in the example of an aircraft bypass turbojet engine T with bypass ratio greater than 16, the radial through apertures 44A, 44B, 44C are positioned axially between the axial position of the guide vanes 20 and that of the trailing edge 43 of the air outlet 4. Preferably, the radial through apertures 44A, 44B, 44C are positioned between the guide vanes 20, preferably, in a plane transversal to the longitudinal axis X. In a preferred manner, the axial length of a radial through aperture 44A, 44B, 44C is at the most equal to 90% of the axial length defined between the axial position of the guide vanes 20 and that of the trailing edge 43. In addition, the radial through apertures 44A, 44B, 44C preferably comprise a downstream end longitudinally distant from the trailing edge 43 by a distance equal to at least 10% of the longitudinal length defined between the axial position of the guide vanes 20 and the trailing edge 43.

Preferably, the radial through apertures 44A, 44B, 44C comprise a longitudinal length L substantially equal to that of the guide vanes 20, that is to say that the longitudinal length L of the radial through apertures 44A, 44B, 44C differ by at the most 10% from that of the guide vanes 20.

To summarize, the air outlet 4 comprises one or more radial through aperture(s) 44A, 44B, 44C making it possible to improve the performances in reverse thrust phase P2, on the one hand while admitting the reverse air flow F-INV into the secondary flow path 7 in complement to the trailing edge 43, and on the other hand by favoring the pressing of the outer air flow F-EXT against the downstream outer wall 42 to limit recirculation. The radial through apertures 44A, 44B, 44C are evenly spread out on the circumference of the air outlet 4 when a homogeneous and global improvement of the performances in reverse thrust phase P2 is desired. In particular, the radial through apertures 44A, 44B, 44C are distant from one another for better mechanical strength (FIG. 5A) or form together an annular through aperture 48 for optimal performances ([Eig.SB]). For a local and thus heterogeneous improvement of the reverse thrust phase P2, the radial through apertures 44A, 44B are conversely localized on one or more given portion(s) of the circumference of the air outlet 4 (FIG. 5C).

Still with reference to FIGS. 5A, 5B and 5C and as described previously, each radial through aperture 44A, 44B, 44C is associated with a single guiding device 1A, 1B, 1C configured, during a thrust phase P1, to close off the inner open face 45 and the outer open face 46 of the radial through aperture 44A, 44B, 44C, and during a reverse thrust phase P2, to guide the outer air flow E-EXT, in particular so that it circulates in the radial through aperture 44A, 44B, 44C and so that it presses against the downstream outer wall 42. In other words, the air outlet 4 comprises a same number of guiding devices 1A, 1B, 1C as radial through apertures 44A, 44B, 44C, of same size and of same distribution. Each radial through aperture 44A, 44B, 44C and each guiding device 1A, 1B, 1C cooperate to increase the performances in reverse thrust phase P2.

It will be noted in particular that each guiding device 1A, 1B, 1C extends over a specific angular portion a corresponding to that over which extends the associated radial through aperture 44A, 44B, 44C. In the example of FIG. 5A, the guiding devices 1A, 1B, 1C are distant from one another whereas in the example of FIG. 5B, the guiding devices 1A, 1B, 1C are adjacent to one another.

A single radial through aperture 44 is considered hereafter and the structural and functional characteristics of the associated guiding device will be described more precisely.

With reference to FIGS. 3B and 4B and as described previously, a guiding device 1 comprises a single inner moveable member 10 and a single outer moveable member 11 moveably mounted between the closed position F (FIG. 3B) and the open position O respectively at the level of the inner open face 45 and at the level of the outer open face 46 of the radial through aperture 44. In other words, only one inner moveable member 10 and one outer moveable member 11 are mounted on a radial through aperture 44. Thus, only one inner moveable member 10 and one outer moveable member 11 are mounted on the angular portion a on which extends the radial through aperture 44.

As illustrated in FIGS. 3B and 4B, the inner moveable member 10 and the outer moveable member 11 are each preferably in the form of a single flap of thickness analogous to those of the downstream inner wall 41 and the downstream outer wall 42. Such flaps have the advantage of having a low bulk and a low on-board mass, so as to close off the inner open face 45 and the outer open face 46 and not fill the radial through aperture 44. Such flaps also guarantee the sealing in closed position F. It goes without saying that the inner moveable member 10 and the outer moveable member 11 could be of another shape, this shape having to close off and not fill the radial through aperture 44 and be in the form of a single-piece member, to limit the bulk and the mass. In particular, preferably, the inner moveable member 10 and the outer moveable member 11 comprise a radial thickness less than one third of the local radial thickness of the air outlet 4, preferentially less than one quarter. Furthermore, preferably, the inner moveable member 10 and the outer moveable member 11 comprise an identical shape and/or a size to facilitate their control, that is to say that the shape and/or the size of the inner moveable member 10 differ at the most by 10% from that (or those) of the outer moveable member 11.

With reference to FIGS. 4B, 6, 7 and 8, the inner moveable member 10 and the outer moveable member 11 are moveably mounted at the level of the inner open face 45 and the outer open face 46 respectively, in particular by pivoting (FIGS. 4B, 6 and 7) or by sliding (FIG. 8) as will be described hereafter.

In the example of FIG. 4B illustrating a first embodiment of the invention, the inner moveable member 10 and the outer moveable member 11 are pivotally mounted between the closed position F, illustrated in FIG. 3B, and the open position O. More precisely, the inner moveable member 10 and the outer moveable member 11 are pivotally mounted along a pivoting axis Y tangential to the air outlet 4 and positioned downstream of the inner open face 45 and the outer open face 46 respectively. The inner moveable member 10 is configured to pivot inwards whereas the outer moveable member 11 is configured to pivot outwards, in a symmetrical manner to the inner moveable member 10 with respect to an axis of symmetry X1 passing through the trailing edge 43 and through the center of the radial through aperture 44. In other words, in open position O, as illustrated in FIG. 4B, the inner moveable member 10 extends projecting into the secondary flow path 7 whereas the outer moveable member 11 extends projecting externally to the air outlet 4 with respect to the longitudinal axis X. In the example of FIG. 4B, in open position, the inner moveable member 10 and the outer moveable member 11 extend projecting along a deployment angle $\gamma 10$, $\gamma 11$ comprised between 30 and 60° with respect to the closed position F. It is specified here and for what follows that the deployment angle $\gamma 10$ is defined as the angle separating the inner open face 45 and the inner moveable member 10 and the deployment angle γ11 that separating the outer open face 46 and the outer moveable member 11. Such a deployment angle γ10, γ11 enables the guiding device 1 to guide in an efficient manner the outer air flow F-EXT in the radial through aperture 44 then in the secondary flow path 7. The reverse air flow F-INV is thus admitted along a substantially longitudinal direction and recirculation in the secondary flow path 7 is eliminated.

The outer moveable member 11 advantageously fulfils a function of scoop by withdrawing a part of the outer air flow L-EXT to inject it into the radial through aperture 44. The inner moveable member 10 makes it possible, for its part, to guide the air flow circulating in the radial through aperture 44 towards the upstream in the secondary flow path 7, which enables an efficient thrust reversal.

Figure 6:
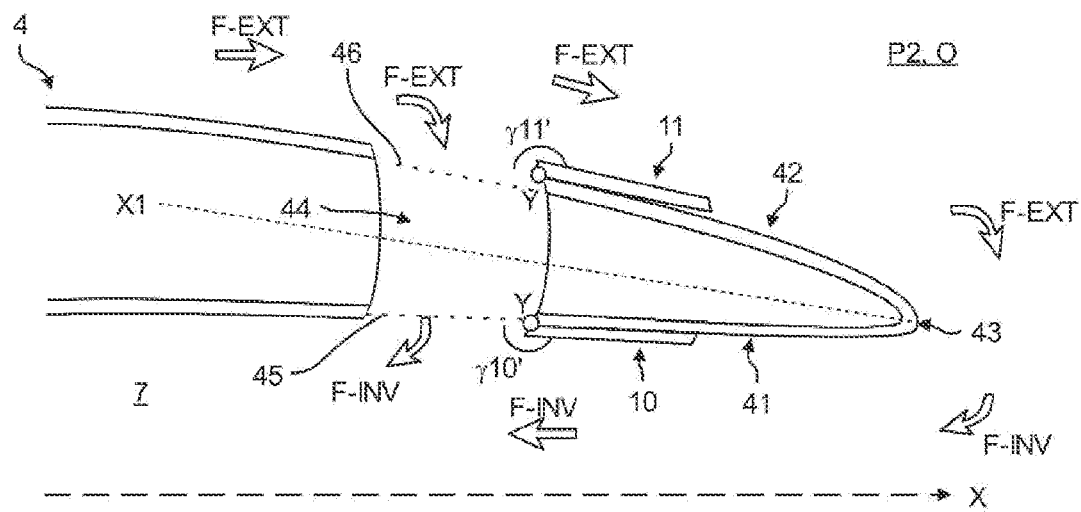
FIG. 6.

In the example of FIG. 6 illustrating a second embodiment of the invention, the deployment angle γ10', γ11' along which extend the inner moveable member 10 and the outer moveable member 11 in open position O is greater than 150°. Preferably, the deployment angle γ10', γ11' is close to 180° so that, in open position, the inner moveable member 10 and the outer moveable member 11 extend against the downstream inner wall 41 and against the downstream outer wall 42 respectively. Such a deployment angle γ10', γ11' has the advantage of efficiently pressing the outer air flow L-EXT against the downstream outer wall 42, the outer air flow F-EXT not having to bypass the outer moveable member 11.

It should be noted that in the two embodiments illustrated in FIGS. 4B and 6, the deployment angle γ10, γ11, γ10', γ11' of the inner moveable member 10 brings about a reduction in the diameter of the air outlet 4. In practice, in order that all the inner moveable members 10 can be displaced in open position O without hindering each other, the radial through apertures 44 are preferably spaced apart from one another, such as illustrated in the example of FIG. 5A. In a complementary or alternative manner, the inner open face 45 of the radial through apertures 44 and the inner moveable members 10 comprise a suitable shape, for example a downstream end extending over a reduced angular range a.

It should also be noted that in the two embodiments illustrated in FIGS. 4B and 6, the deployment angle γ10, γ10' of the inner moveable member 10 could be different from the deployment angle γ11, γ11' of the outer moveable member 11. As an example, the deployment angle γ11, γ11' of the outer moveable member 11 could be greater than the deployment angle γ10, γ10' of the inner moveable member 10 in order to maximize the capture of the outer air flow F-EXT at the level of the radial through apertures 44 without significantly reducing that at the level of the trailing edge 43.

Figure 7:
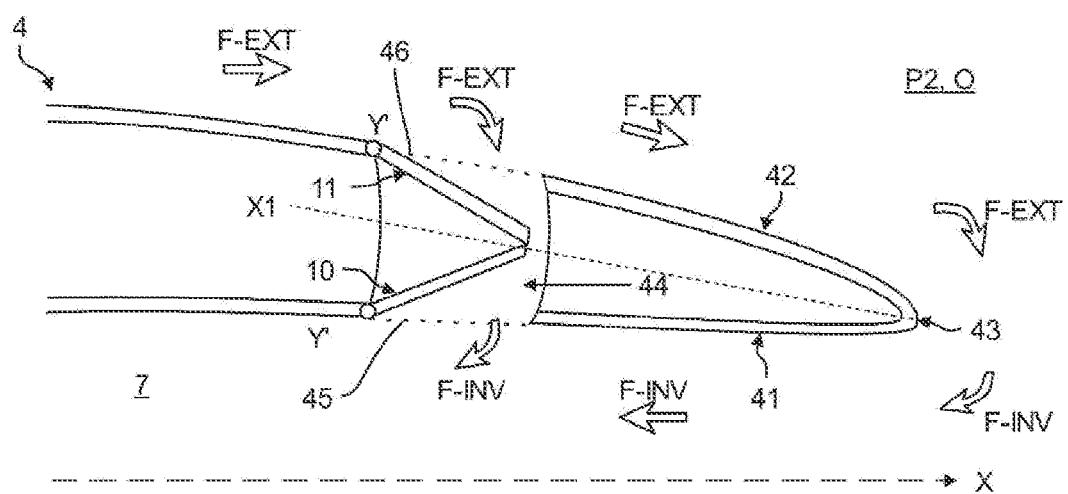
FIG. 7.

In the example of FIG. 7 illustrating a third embodiment of the invention, the pivoting axis Y' of the inner moveable member 10 and the outer moveable member 11 is positioned upstream of the inner open face a and the outer open face 46 respectively, still tangential to the air outlet 4. The inner moveable member 10 is configured to pivot outwards whereas the outer moveable member 11 is configured to pivot inwards, in a symmetrical manner to the inner moveable member 10 with respect to an axis of symmetry X1 passing through the trailing edge 43 and through the center of the radial through aperture 44. In other words, in open position O, as illustrated in FIG. 7, the inner moveable member 10 and the outer moveable member 11 both extend within the radial through aperture 44. Preferably, as illustrated in FIG. 7, the inner moveable member 10 and the outer moveable member 11 are in contact, in particular at the level of their downstream end, in open position O. In an advantageous manner, the bulk of the guiding device 1 in open position O is minimal. Thus, an outer air flow F-EXT can circulate in the radial through aperture 44 while being guided by the moveable members 10, 11 which reverses the direction of circulation in order that the outer air flow F-EXT is guided upstream in the secondary flow path 7, which enables an efficient thrust reversal. In an advantageous manner, the reverse air flow F-INV does not have to bypass the outer moveable member 11 during a reverse thrust phase.

Figure 8:
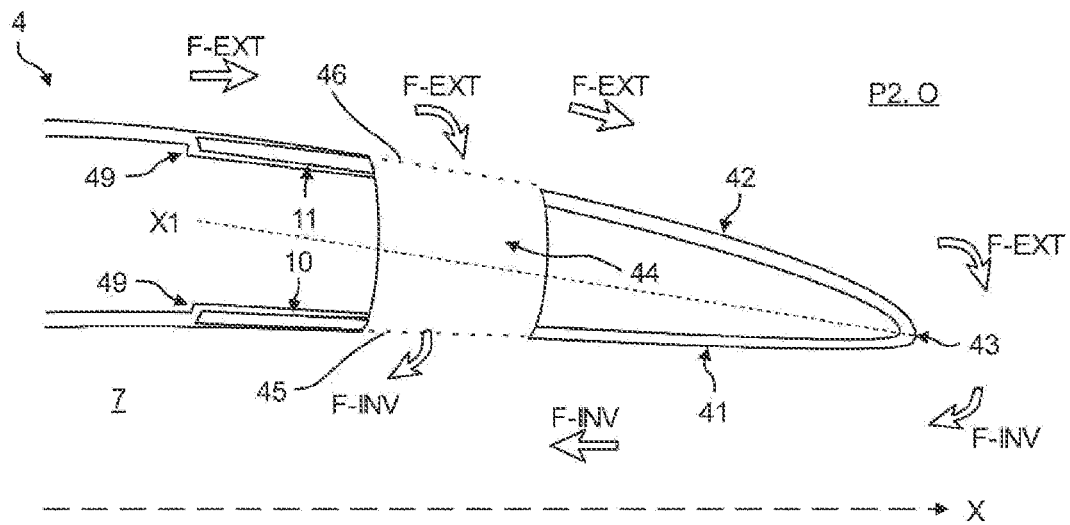
FIG. 8 are three schematic representations in longitudinal half-section of an air outlet during a reverse thrust phase in which the moveable members are in open position according to respectively a second, a third and a fourth embodiment of the invention.

In the example of FIG. 8 illustrating a fourth embodiment of the invention, the inner moveable member 10 and the outer moveable member 11 are slidingly mounted against the downstream inner wall 41 and against the downstream outer wall 42 between the closed position F and the open position O. Preferably, as illustrated in FIG. 8, the inner moveable member 10 is slidingly mounted internally to the downstream outer wall 41 whereas the outer moveable member 11 is slidingly mounted externally to the downstream inner wall 42, in a symmetrical manner with respect to the axis of symmetry X1. Also preferably, as illustrated in FIG. 8, the inner moveable member 10 and the outer moveable member 11 are slidingly mounted upstream. Furthermore, in the example of FIG. 8, in open position O, the inner moveable member and the outer moveable member 11 extend into housings 49 formed respectively at the level of the downstream inner wall 41 and the downstream outer wall 42. In an advantageous manner, the bulk of the guiding device 1 in open position O is minimal. This also makes it possible to efficiently press the outer air flow F-EXT against the downstream outer wall 42. In an advantageous manner, the reverse air flow F-INV does not have to bypass the outer moveable member 11 during a reverse thrust phase.

In the four embodiments of the invention described above, the inner moveable member 10 and the outer moveable member 11 are mounted in a symmetrical manner with respect to the axis of symmetry X1 for an easy control, in practice by means of a single displacement member (not represented). Preferably, all the inner moveable members 10 and all the outer moveable members 11 of an air outlet 4 are mounted in an identical manner for an easy control, in practice by means of the same displacement member.

However, it goes without saying that the inner moveable member 10 and the outer moveable member of a same guiding device 1 may be mounted in a different manner, in particular to cumulate the advantages of the two mountings. As an example, the inner moveable member 10 may be pivotally mounted projecting inwards with respect to the longitudinal axis X in order to guide efficiently the reverse air flow F-INV in the secondary flow path 7 whereas the outer moveable member 11 is slidingly mounted to limit the bulk and favor the pressing of the outer air flow F-EXT against the downstream outer wall 42. Generally speaking, the inner moveable member 10 and the outer moveable member 11 may each be mounted according to any of the embodiments of the invention described.

It should be noted that the embodiments of the invention described above are only given as examples and are thus not limiting. In particular, the deployment angle γ10, γ11, γ10', γ11' may be chosen different as a function of the desired quantity of reverse air flow F-INV admitted. This sliding may also take place downstream, notably to meet constraints of integrating the guiding device 1 in the air outlet 4.

Figure 9A:
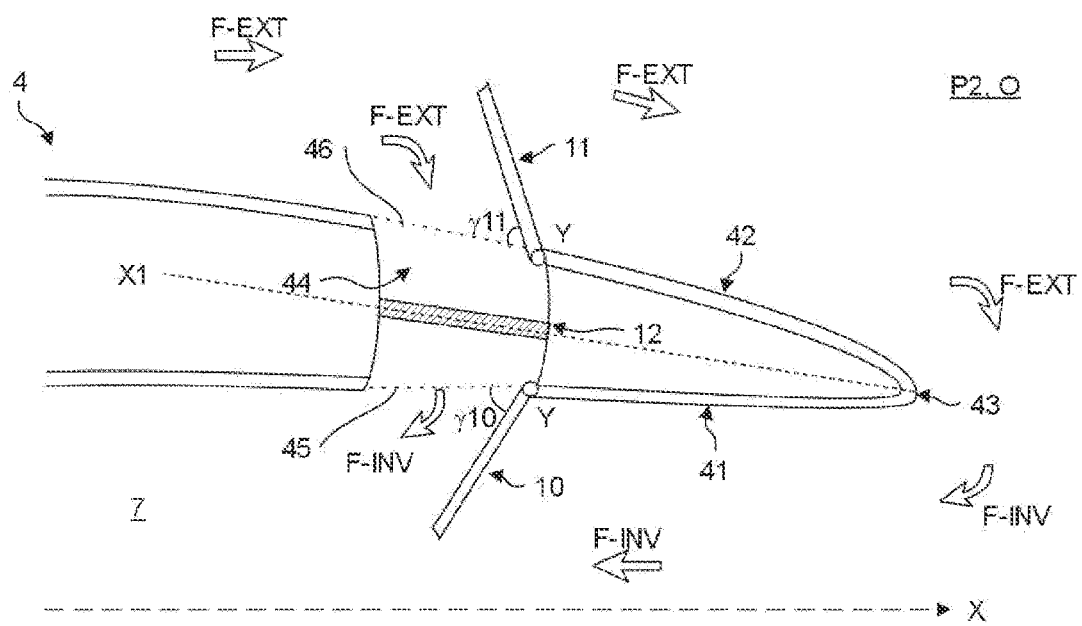
FIG. 9A.
Figure 9B:
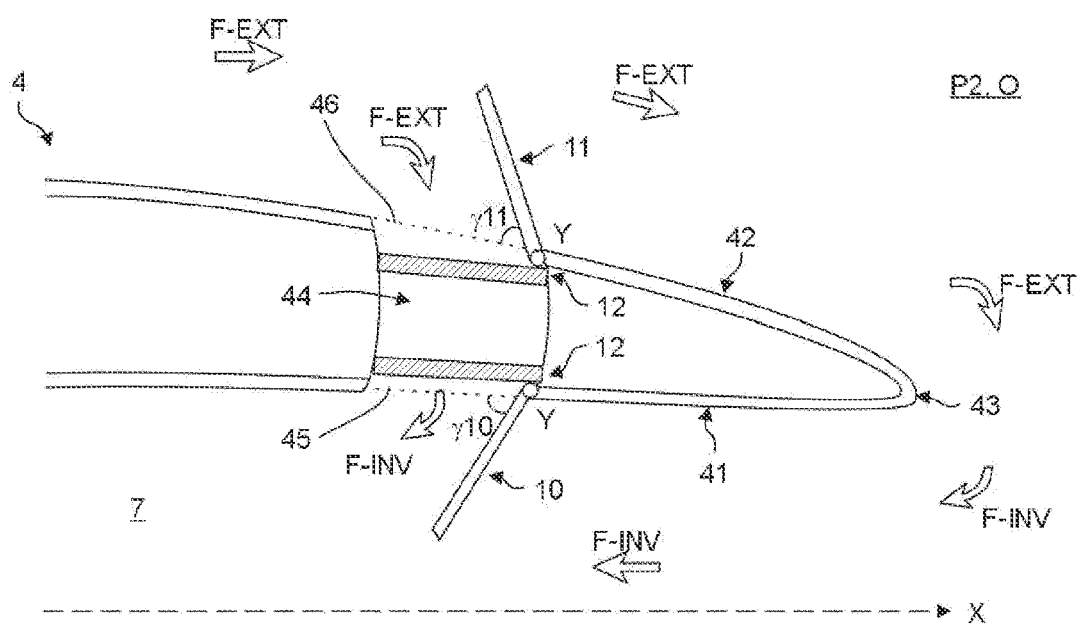
FIG. 9B are two schematic representations in longitudinal half-section of an air outlet during a reverse thrust phase in which a guiding device comprises perforated members according to two alternative embodiments of the invention.

According to an alternative embodiment of the invention illustrated in FIGS. 9A and 9B, the guiding device 1 comprises, apart from the inner moveable member 10 and the outer moveable member 11, one or more perforated member (s) 12. Each perforated member 12 is positioned within the radial through aperture 44 so as to be traversed by the outer air flow F-EXT during a reverse thrust phase P2, and is configured to reduce the twisted motion V (FIG. 4B) of the outer air flow F-EXT during its admission into the secondary flow path 7. Such a perforated member 12 further makes it possible to guide the reverse air flow F-INV so that it circulates along a substantially longitudinal direction in the secondary flow path 7. Preferably, the perforated member 12 is in the form of a grid or fins advantageously making it possible to guide the reverse air flow F-INV along a substantially longitudinal direction in the secondary flow path 7. In the example of FIG. 9A, the guiding device 1 comprises a single perforated member 12 extending longitudinally to the center of the radial through aperture 44. In the example of FIG. 9B, the guiding device 1 comprises two perforated members 12 extending longitudinally at the level of the inner open face 45 and the outer open face 46.

In practice, the choice of the number and the position of the perforated members 12 is dependent on the mounting of the inner moveable member 10 and the outer moveable member 11, because this mounting generates integration constraints. The perforated members 12 have here been described in the example of an inner moveable member 10 and an outer moveable member 11 pivotally mounted according to the first embodiment of FIG. 4B. In this example, one or more perforated member(s) 12 may be mounted in the radial through aperture 44 without integration constraint. If the third embodiment of the invention illustrated in FIG. 7 is now considered, a perforated member 12 positioned such as in the example of FIG. 9A does not enable the correct displacement of the inner moveable member 10 and the outer moveable member 11. It will thus be preferred to position a perforated member 12 at the level of the inner open face 45 and/or the outer open face 46 such as illustrated in FIG. 9B. Still in this example, preferably, the inner moveable member 10 and the outer moveable member 11 comprise a perforated member imprint, so as to be able to cooperate by nesting with the perforated member 12 in closed position F.

To summarize, the inner moveable member 10 and the outer moveable member 11 are moveably mounted by pivoting or by sliding, depending on the desired performances in reverse thrust phase P2 and the integration constraints in the air outlet 4. Preferably, the inner moveable member 10 and the outer moveable member 11 are mounted symmetrically with respect to the axis of symmetry X1 to facilitate the control by the displacement member. One or more perforated member(s) may be positioned within the radial through aperture 44 to reinforce the guiding action of the outer air flow F-EXT by the guiding device 1.

A method for using an aircraft propulsion assembly E such as described previously is described hereafter, of which the air outlet 4 comprises radial through apertures 44 and for each, a guiding device 1. It is considered that the turbojet engine T is initially in thrust phase P1 and that the inner moveable member 10 and the outer moveable member 11 of the guiding device 1 are in closed position F.

During a reverse thrust phase P2 of the turbojet engine T, the pitch angle of the vanes of the fan 5 is modified so as to reverse the direction of the secondary air flow F2 circulating in the secondary flow path 7 in the reverse air flow F-INV, so as to favor a deceleration of the aircraft. According to the invention, parallel to the modification of the pitch angle of the vanes of the fan 5, the inner moveable member 10 and the outer moveable member 11 of each guiding device 1 are displaced in open position O, by pivoting or by sliding, by means of one or more displacement member(s).

Preferably, the inner moveable member 10 and the outer moveable member 11 are identical and displaced in a symmetrical manner with respect to the axis of symmetry X1, so as to be able to be displaced in a simple and practical manner by a single displacement member. Preferably, all of the inner moveable members 10 and outer moveable members 11 of the air outlet 4 are identical and displaced by a single displacement member to limit the bulk of the guiding device 1. In the case of a pivoting, the displacement member may be in the form of a see-saw or a wheel, advantageously making it possible to pivot all the inner moveable members 10 and all the outer moveable members 11 in a simultaneous, simple and rapid manner and along a same deployment angle $\gamma 10$, $\gamma 11$, $\gamma 10'$, $\gamma 11'$. In the case of a sliding, the displacement member may be in the form of one or more actuators, for example hydraulic or pneumatic jacks connected together having the same advantages.

In an alternative manner, depending on the upstream air flow F and the desired thrust reversal, only the inner moveable member 10 and the outer moveable member 11 of certain guiding devices 1 may be displaced in open position O, notably in the example of the embodiments illustrated in FIGS. 5A and 5B. Furthermore, the inner moveable member 10 and the outer moveable member 11 of the guiding devices 1 could be displaced by a different deployment angle $\gamma 10$, $\gamma 10'$, $\gamma 11$, $\gamma 11'$, by a member for displacing the inner moveable members 10 and a member for displacing the outer moveable members 11 as an example. According to a preferred aspect, the inner moveable member 10 and the outer moveable member 11 of a guiding device 1 are actuated in an independent manner, so as to be able to be displaced along a different deployment angle and in a time offset manner, for greater freedom.

During a new thrust phase P1 of the turbojet engine T, the pitch angle of the vanes of the fan 5 is modified again so as to re-establish the secondary air flow F2 flowing from upstream to downstream. According to the invention, parallel to the modification of the pitch angle of the vanes of the fan 5, the inner moveable member 10 and the outer moveable member 11 are displaced in the opposite direction from the open position O to the closed position F. In an advantageous manner, such an air outlet 4 thus has an aerodynamic profile both in thrust phase P1 and in reverse thrust phase P2. In addition, the passage from the closed position F to the open position O of the inner moveable member 10 and the outer moveable member 11 and vice versa is simple and rapid to implement, and repeatable as desired.

The invention claimed is:

1. An aircraft propulsion assembly comprising:
an aircraft bypass turbojet engine comprising a primary radially inner flow path and a secondary radially outer flow path in which a secondary air flow circulates from upstream to downstream during a thrust phase and a reverse air flow from downstream to upstream during a reverse thrust phase, a nacelle mounted on the turbojet engine and extending around the longitudinal axis of said turbojet engine, said turbojet engine comprising a plurality of guide vanes extending radially into the secondary flow path, said nacelle comprising an air outlet at a downstream end, said air outlet comprising a downstream inner wall, turned towards the longitudinal axis and configured to delimit externally the secondary flow path and to guide the secondary air flow and the reverse air flow, and a downstream outer wall, opposite to the downstream inner wall and configured to guide an outer air flow circulating from upstream to downstream, said downstream inner wall and said downstream outer wall being connected together downstream by a trailing edge, wherein said air outlet comprises:
a plurality of radial through apertures spread out on a circumference of said air outlet, each radial through aperture extending onto an angular portion of said air outlet along a transversal plane situated upstream of said trailing edge, each radial through aperture comprising an inner open face having an upstream edge and a downstream edge formed in said downstream inner wall and an outer open face having an upstream edge and a downstream edge formed in said downstream outer wall, each radial through aperture being axially positioned at a location between said guide vanes and said trailing edge and delimited by said upstream edges and said downstream edges, and
each radial through aperture having a single guiding device comprising a single inner moveable member and a single outer moveable member mounted, respectively, at said inner open face and said outer open face and are moveable between:
a closed position in which the inner moveable member closes off said inner open face of said downstream inner wall and the outer moveable member closes off said outer open face of said downstream outer wall, said radial through aperture defining a closed cavity delimited by said inner moveable member and said outer moveable member to conserve performances in the thrust phase,
an open position in which said inner moveable member and said outer moveable member are configured to allow said outer air flow in said radial through aperture from said outer open face to said inner open face to increase the reverse air flow admitted into the secondary flow path, to favor a reverse thrust phase; and
wherein said inner moveable member of said single guiding device is pivotally mounted along a pivoting axis tangential to said air outlet,
wherein said single guiding device comprises a displacement member for displacing the inner moveable member and the outer moveable member between the closed position and the open position, the displacement member being positioned upstream of the radial through aperture.

2. The aircraft propulsion assembly according to claim 1, wherein said plurality of radial through apertures are spread out on the circumference of said air outlet along a same transversal plane situated upstream of said trailing edge.

3. The aircraft propulsion assembly according to claim 1, wherein, in the open position, said inner moveable member projects inwards with respect to the longitudinal axis.

4. The aircraft propulsion assembly according to claim 1, wherein, in the open position, said inner moveable member extends into said radial through aperture outwards with respect to the longitudinal axis.

5. The aircraft propulsion assembly according to claim 1, wherein said inner moveable member and said outer moveable member of at least one same-said single guiding device are moveably mounted in a symmetrical manner with respect to an axis of symmetry passing through said trailing edge and through a center of said radial through aperture associated with said single guiding device.

6. The aircraft propulsion assembly according to claim 1, wherein said single guiding device comprises at least one perforated member positioned in said radial through aperture associated with said single guiding device.

7. The aircraft propulsion assembly according to claim 1, wherein the turbojet engine comprises a variable pitch fan.

8. A method for using the aircraft propulsion assembly according to claim 1, wherein said inner moveable member and said outer moveable member of said single guiding device of said air outlet are in the closed position during a thrust phase of the turbojet engine, the method comprising, during a reverse thrust phase of said turbojet engine, at least one step of displacement of said inner moveable member and said outer moveable member from the closed position to the open position.

9. An aircraft propulsion assembly comprising:
an aircraft bypass turbojet engine comprising a primary radially inner flow path and a secondary radially outer flow path in which a secondary air flow circulates from upstream to downstream during a thrust phase and a reverse air flow from downstream to upstream during a reverse thrust phase, wherein a plurality of guide vanes extend radially into the secondary flow path, a nacelle mounted on the turbojet engine and extending around the longitudinal axis of said turbojet engine, said nacelle comprising an air outlet at a downstream end, said air outlet comprising a downstream inner wall and a downstream outer wall opposite to the downstream inner wall and configured to guide an outer air flow circulating from upstream to downstream, said downstream inner wall and said downstream outer wall both connected downstream to a trailing edge,
a plurality of radial through apertures spread out on a circumference of said air outlet, each radial through aperture comprising an inner open face defined by an upstream edge and a downstream edge formed in said downstream inner wall and an outer open face defined by an upstream edge and a downstream edge formed in said downstream outer wall, wherein each radial through aperture is axially positioned at a location between said guide vanes and said trailing edge, and
each radial through aperture having a guiding device comprising an inner moveable member having a single pivot point at said inner open face adjacent the upstream edge or the downstream edge and an outer moveable member having a single pivot point at said outer open face adjacent the upstream edge or the downstream edge, said guiding device movable between:
a closed position in which the inner moveable member closes off said inner open face of said downstream inner wall and the outer moveable member closes off said outer open face of said downstream outer wall, said radial through aperture defining a cavity delimited by said inner moveable member and said outer moveable member to conserve performances in the thrust phase,
an open position in which said inner moveable member and said outer moveable member are configured to allow said outer air flow in said radial through aperture from said outer open face to said inner open face to increase the reverse air flow admitted into the secondary flow path to favor a reverse thrust phase; and
wherein said guiding device comprises a displacement member for displacing the inner moveable member and the outer moveable member between the closed position and the open position.

10. The aircraft propulsion assembly according to claim 9, wherein the displacement member is positioned upstream of the radial through aperture.

11. The aircraft propulsion assembly according to claim 9, wherein each radial through aperture extends onto an angular portion of said air outlet along a transversal plane situated upstream of said trailing edge.

12. The aircraft propulsion assembly according to claim 9, wherein the turbojet engine comprises a variable pitch fan.

13. The aircraft propulsion assembly according to claim 9, wherein said single guiding device comprises at least one perforated member positioned in said radial through aperture associated with said single guiding device.

14. An aircraft propulsion assembly comprising:
- an aircraft bypass turbojet engine comprising a primary radially inner flow path and a secondary radially outer flow path in which a secondary air flow circulates from upstream to downstream during a thrust phase and a reverse air flow from downstream to upstream during a reverse thrust phase, wherein a plurality of guide vanes extend radially into the secondary flow path,
- a nacelle mounted on the turbojet engine and extending around the longitudinal axis of said turbojet engine, said nacelle comprising an air outlet at a downstream end, said air outlet comprising a downstream inner wall and a downstream outer wall opposite to the downstream inner wall and configured to guide an outer air flow circulating from upstream to downstream, said downstream inner wall and said downstream outer wall both connected downstream to a trailing edge,
- a plurality of radial through apertures spread out on a circumference of said air outlet, each radial through aperture comprising an inner open face defined by an upstream edge and a downstream edge formed in said downstream inner wall and an outer open face defined by an upstream edge and a downstream edge formed in said downstream outer wall, wherein each radial through aperture is axially positioned at a location between said guide vanes and said trailing edge, and
- each radial through aperture having a guiding device comprising an inner moveable member having a single pivot point at said inner open face adjacent the upstream edge or the downstream edge and an outer moveable member having a single pivot point at said outer open face adjacent the upstream edge or the downstream edge, said guiding device movable between:
  - a closed position in which the inner moveable member closes off said inner open face of said downstream inner wall and the outer moveable member closes off said outer open face of said downstream outer wall, said radial through aperture defining a cavity delimited by said inner moveable member and said outer moveable member to conserve performances in the thrust phase,
  - an open position in which said inner moveable member and said outer moveable member are configured to allow said outer air flow in said radial through aperture from said outer open face to said inner open face to increase the reverse air flow admitted into the secondary flow path to favor a reverse thrust phase,
- wherein said guiding device comprises a displacement member for displacing the inner moveable member and the outer moveable member between the closed position and the open position, and
- wherein the displacement member is positioned upstream of the upstream edges of the inner open face and the outer open face.

15. The aircraft propulsion assembly according to claim 14, wherein the turbojet engine comprises a variable pitch fan.

\* \* \* \* \*